Aug. 12, 1924.

A. HARGRAVES

SOLID TIRE

Filed Dec. 3, 1921

1,504,449

INVENTOR.
Albert Hargraves
BY
ATTORNEY.

Patented Aug. 12, 1924.

1,504,449

UNITED STATES PATENT OFFICE.

ALBERT HARGRAVES, OF AKRON, OHIO, ASSIGNOR TO THE FIRESTONE TIRE AND RUBBER COMPANY, OF AKRON, OHIO, A CORPORATION OF OHIO.

SOLID TIRE.

Application filed December 3, 1921. Serial No. 519,633.

*To all whom it may concern:*

Be it known that I, ALBERT HARGRAVES, a citizen of the United States, residing at Akron, in the county of Summit, State of Ohio, have invented certain new and useful Improvements in Solid Tires, of which the following is a specification.

This invention relates to resilient or elastic tires adapted for use on vehicles and particularly on trucks or heavy commercial vehicles. The object of the invention is to improve upon the formation of the tread of the tire so as to increase its tractive and non-skidding properties and to avoid objectionable noise in running the tire over a smooth pavement. The present tire is provided with a central groove or depression which serves to ventilate the tire and with cross ribs over the groove which form pockets to prevent skidding, and constitute transverse formations which increase the traction of the tire, and serve to brace the two parallel tread portions of the tire.

In the drawings there is shown an embodiment of my invention which illustrates one form which the tire may take it being understood that the showing and description is for the purpose of enabling one skilled in the art to practise the invention and is not to be understood as limiting the invention to the form shown herein.

The tire comprises a solid band of rubber as 1, which is secured to a metallic rim 2, by any suitable means, preferably by vulcanization. The tire tapers gradually from the flanges of the rim and in the central portion of the tread there is formed a relatively deep groove 3. This groove extends within the body of the tire for a considerable depth and affords a means to ventilate and cool the center of the tire, thus providing two tread portions of similar height, indicated by the numeral 4.

Figure 1:
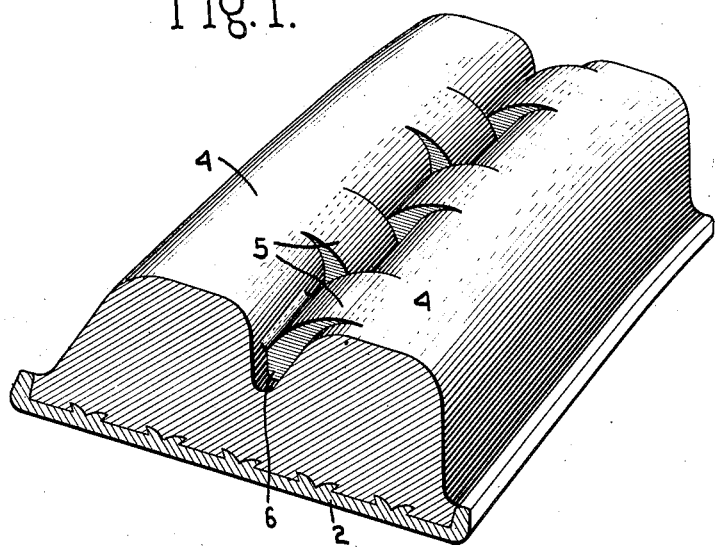
Fig. 1 is a perspective view of a section of the improved solid tire.
Figure 3:
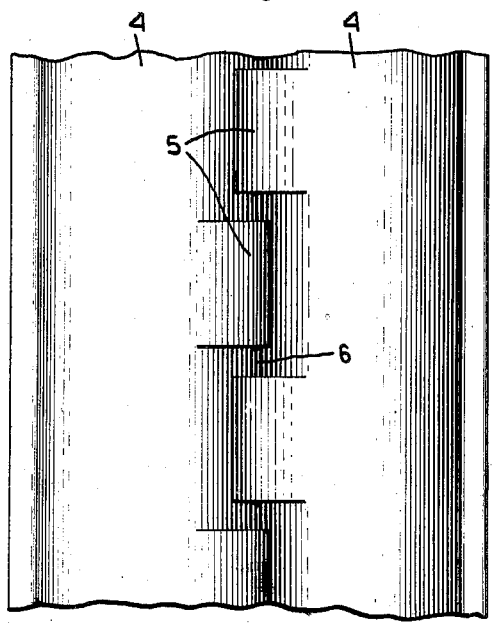
Figure 3 is a plan view thereof.

From each tread portion of the tire there is extended across the groove 3 to a point on the other tread portion inward of the outer surface of the tire, bridge pieces or transverse ribs, indicated by the numeral 5. These bridge pieces or ribs are arranged alternately or in staggered relation and are spaced apart slightly as shown in the figures, particularly Fig. 3, so that each tread portion is tied to the other tread portion and a series of pockets 6 are formed between the two portions of the tire.

Figure 2:
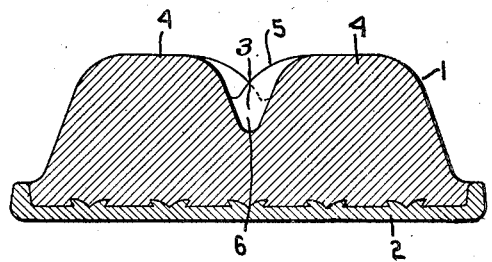
Figure 2 is a cross-section of the tire.

The combination of the transverse ribs and the pockets located between them create a firm positive grip or traction between the tire and the pavement and as the pockets or recesses in the tire are vented above the tread, the objectionable "popping" noise, due to the sudden release of the vacuum in a cup is avoided. As each tread portion is bound or tied together with the other tread portion there is no tendency of the two portions to separate or crack at the base of the groove. The pockets provide sufficient suction to prevent slipping of the tire on wet pavements and the noise of the tire is eliminated as has been described. The transverse ribs are preferably arranged as shown in Figure 2, in which it will be seen that they are inclined toward the center of the tire in opposite directions, alternately, from points on each tread portion of the tire to points on the other tread portion inward of the tread surface. In this manner the pockets are vented to avoid noise in running the tire and traction is increased at the tread.

Changes and modifications may be made in the exact form of tire shown in the drawings without departing from the scope of the invention as set forth in the claims accompanying this application.

Claims:

1. A resilient tire comprising two tread portions separated by a circumferential groove and transverse strengthening and tying ribs extending from the tread surface of one portion to points on the side of the other portion inward of its tread surface.

2. A resilient tire comprising two tread portions separated by a circumferential groove and strengthening and tying ribs extending transversely of the groove, said ribs being inclined.

3. A resilient tire comprising two tread portions separated by a circumferential groove and strengthening and tying ribs extending transversely of the groove, said ribs being inclined toward the base of the tire in opposite directions.

4. A resilient tire comprising two tread portions separated by a relatively deep circumferential groove, strengthening ribs extending from each tread portion to the other, said ribs being inclined toward the center of the tire in opposite directions alternately and extending from the tread surface of one portion to points inward of the tread surface on the other portion.

5. A resilient tire comprising two tread portions separated by a relatively deep circumferential groove, strengthening ribs extending from one tread portion to the other, said ribs being inclined toward the center of the tire and being spaced apart circumferentially of the tire, whereby pockets are formed by the groove between the ribs.

6. A resilient tire comprising two tread portions separated by a relatively deep circumferential groove, strengthening ribs extending from each tread portion to the other, said ribs being inclined toward the center of the tire in opposite directions alternately and extending from the tread surface of one of said portions to points inward of the tread surface on the other portion, said ribs being spaced apart circumferentially of the tire, whereby pockets are formed by the groove between the ribs.

7. A resilient tire comprising two separate, circumferential, parallel tread portions, and strengthening and tying ribs extending from each tread portion to the other, said ribs being inclined toward the center of the tire in opposite directions alternately and extending from the tread surface of each portion to points inward of the tread surface on the other portion.

ALBERT HARGRAVES.